United States Patent
Toyoda et al.

(10) Patent No.: US 7,561,311 B2
(45) Date of Patent: Jul. 14, 2009

(54) IMAGE FORMING APPARATUS AND IMAGE READING APPARATUS

(75) Inventors: Keiko Toyoda, Toyokawa (JP); Hiroshi Nishikawa, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 949 days.

(21) Appl. No.: 11/020,171

(22) Filed: Dec. 27, 2004

(65) Prior Publication Data

US 2006/0077484 A1 Apr. 13, 2006

(30) Foreign Application Priority Data

Oct. 12, 2004 (JP) .............................. 2004-298062

(51) Int. Cl.
  H04N 1/04 (2006.01)
  H04N 1/46 (2006.01)
(52) U.S. Cl. ...................... 358/474; 358/498; 358/497; 358/505
(58) Field of Classification Search ................ 358/474, 358/498, 497, 505, 471, 496, 488; 399/82, 399/19, 79, 87; 250/239; 382/312
  See application file for complete search history.

(56) References Cited

U.S. PATENT DOCUMENTS

| | | | | |
|---|---|---|---|---|
| 4,711,556 A | * | 12/1987 | Abuyama | 399/87 |
| 4,907,031 A | * | 3/1990 | Kawatsura et al. | 399/19 |
| 5,185,634 A | * | 2/1993 | Miramatsu | 399/79 |
| 5,812,901 A | * | 9/1998 | Morikawa | 399/19 |
| 5,832,338 A | * | 11/1998 | Kuga | 399/82 |
| 5,917,616 A | * | 6/1999 | Chou et al. | 358/488 |
| 6,002,805 A | * | 12/1999 | Suzuki et al. | 358/474 |
| 6,295,389 B1 | * | 9/2001 | Inui et al. | 382/312 |
| 7,187,480 B2 | * | 3/2007 | Sunada et al. | 358/498 |
| 7,342,693 B2 | * | 3/2008 | Morisaki | 358/496 |

FOREIGN PATENT DOCUMENTS

| | | | |
|---|---|---|---|
| JP | 09-136295 A | | 5/1997 |
| JP | 10142848 | * | 5/1998 |
| JP | 2001-272829 | | 10/2001 |
| JP | 2001272829 | * | 10/2001 |

OTHER PUBLICATIONS

English translation of JP-2001272829.*
English translation of JP-10142848.*

* cited by examiner

Primary Examiner—Houshang Safaipour
(74) Attorney, Agent, or Firm—Morrison & Foerster LLP

(57) ABSTRACT

An image forming apparatus capable of controlling movement of a transparent member suitably depending on various situations by including a transparent member, a feeding unit that feeds an original document to the transparent member, a reading unit that reads an image of the document fed on the transparent member via the transparent member, a moving unit that reciprocates the transparent member in a prescribed direction, and a controller that moves the transparent member forward in one direction from a home position while one document passes through a reading position, and stops the transparent member and then moves the transparent member backward to the home position when an interruption event of reading the document occurs.

19 Claims, 10 Drawing Sheets

IMAGE FORMING APPARATUS AND IMAGE READING APPARATUS

This application is based on Japanese Patent Application No. 2004-298062 filed in Japan on Oct. 12, 2004, the entire content of which is hereby incorporated by reference.

BACKGROUND OF THE INVENTION

1. Field of the Invention

The present invention relates to an image forming apparatus and an image reading apparatus. In particular, the present invention relates to an image forming apparatus and an image reading apparatus for reading a document using so-called sheet-through scanning.

2. Description of Related Art

In recent years, in view of convenience for users, many models of image forming apparatuses (e.g., photocopiers) which adopt sheet-through scanning in addition to movable optical scanning are introduced into the market. In the movable optical scanning, a document is placed on a platen glass, and the stationary document is read by moving an optical system under the document. In the sheet-through scanning, a document is moved to pass through a reading position on a platen glass using an automatic document feeder (ADF), and the document is read by a stationary optical system under the platen glass.

In the image forming apparatus, the movable optical scanning and the sheet-through scanning are selectively used depending on the application. For example, the movable optical scanning is used for copying a document such as a book which is not suitably read using the ADF. The sheet-through scanning is used for copying a document comprising a plurality of sheets which can be fed one by one automatically.

When dust is attached to the platen glass, in both of the scanning methods, the dust is read together with document into an image. In the case of reading by the movable optical scanning, the dust is simply reproduced as a black point corresponding to the size of the dust. However, in the case of reading by the sheet-through scanning, the dust is reproduced as a black stripe extending from one end to the other end of the document image. The black stripe is hardly negligible.

In an attempt to address the problem, image reading apparatuses for reducing the occurrence of the black stripe in the presence of dust attached to the upper surface of the platen glass have been developed.

In an image forming apparatus disclosed in Japanese laid-open patent publication No. 2001-272829, at the time of reading the document (at the time of feeding the document by the ADF), the platen glass is moved in an secondary scanning direction (in a feeding direction of the document). According to the disclosure, even if dust is attached to the platen glass, the dust does not stay at the document reading position. As a result, even though it depends on the movement of the platen glass, the read dust is reproduced as a short line, for example. It is possible to at least avoid the situation in which the read dust is reproduced as a black stripe extending from one end to the other end of the document image, or it is possible to reduce the occurrence of reproducing such a black stripe.

In the apparatus having the above structure, since the platen glass is a movable member, it is necessary to suitably control the movement of the platen glass. Japanese laid-open patent publication No. 2001-272829 discloses basic operation of the platen glass. Specifically, during the operation sequence from the start of reading the document to the end of the reading, a reciprocal movement is made by moving the platen glass by a predetermined distance and moving the platen glass back to the home position. However, Japanese laid-open patent publication No. 2001-272829 does not disclose any movement control of the platen glass, e.g., when a jam of the document occurs in the ADF.

In view of the above, an object of the present invention is to provide an image forming apparatus and an image reading apparatus which makes it possible to suitably control movement of a platen glass depending on various situations.

OBJECT AND SUMMARY

An object of the present invention is to provide an image forming apparatus and an image reading apparatus which solves the above problems, and which achieves improvement in suitably controlling movement of a platen glass depending on various situations.

The object is achieved by providing an image forming apparatus and an image reading apparatus having the following structure.

An image forming apparatus including: a transparent member, a feeding unit that feeds an original document to the transparent member, a reading unit that reads an image of the document fed on the transparent member via the transparent member, a moving unit that reciprocates the transparent member in a prescribed direction, and a controller that moves the transparent member forward in one direction from a home position while one document passes through a reading position, and stops the transparent member and then moves the transparent member backward to the home position when an interruption event of reading the document occurs.

Further, the interruption event is a feeding failure of the document in said feeding unit.

Further the image forming apparatus including a receiving unit that receives a reading interruption instruction from a user, wherein said interruption event is the reading interruption instruction from said receiving unit.

Further, the feeding unit feeds the document from a plurality of sheets of document stack one by one at intervals and said controller moves the transparent member backward to the home position in a time period from the time when a rear end of one document passes the reading position until the time when feeding of the next document is started.

Further, the feeding unit feeds the document from a plurality of sheets of document stack one by one at intervals and said controller stops the transparent member and moves the transparent member backward for returning the transparent member to the home position before the rear end of one document does not fully pass the reading position.

Further the image forming apparatus including an image forming unit that reproduces a read image by printing the read image on a recording sheet, wherein said interruption event is a feeding failure of the recording sheet in the image forming unit.

Further the feeding unit is attached to the image forming apparatus body such that the feeding unit can be opened and closed, and reading of the document is performed when the feeding unit is closed with respect to the image forming apparatus body; and said interruption event is opening of the feeding unit with respect to the image forming apparatus.

Further the controller prohibits movement of the transparent member when the feeding unit is opened.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Hereinafter, an embodiment of an image forming apparatus according to the present invention will be described in conjunction with a digital color photocopier as an example.

Figure 1:
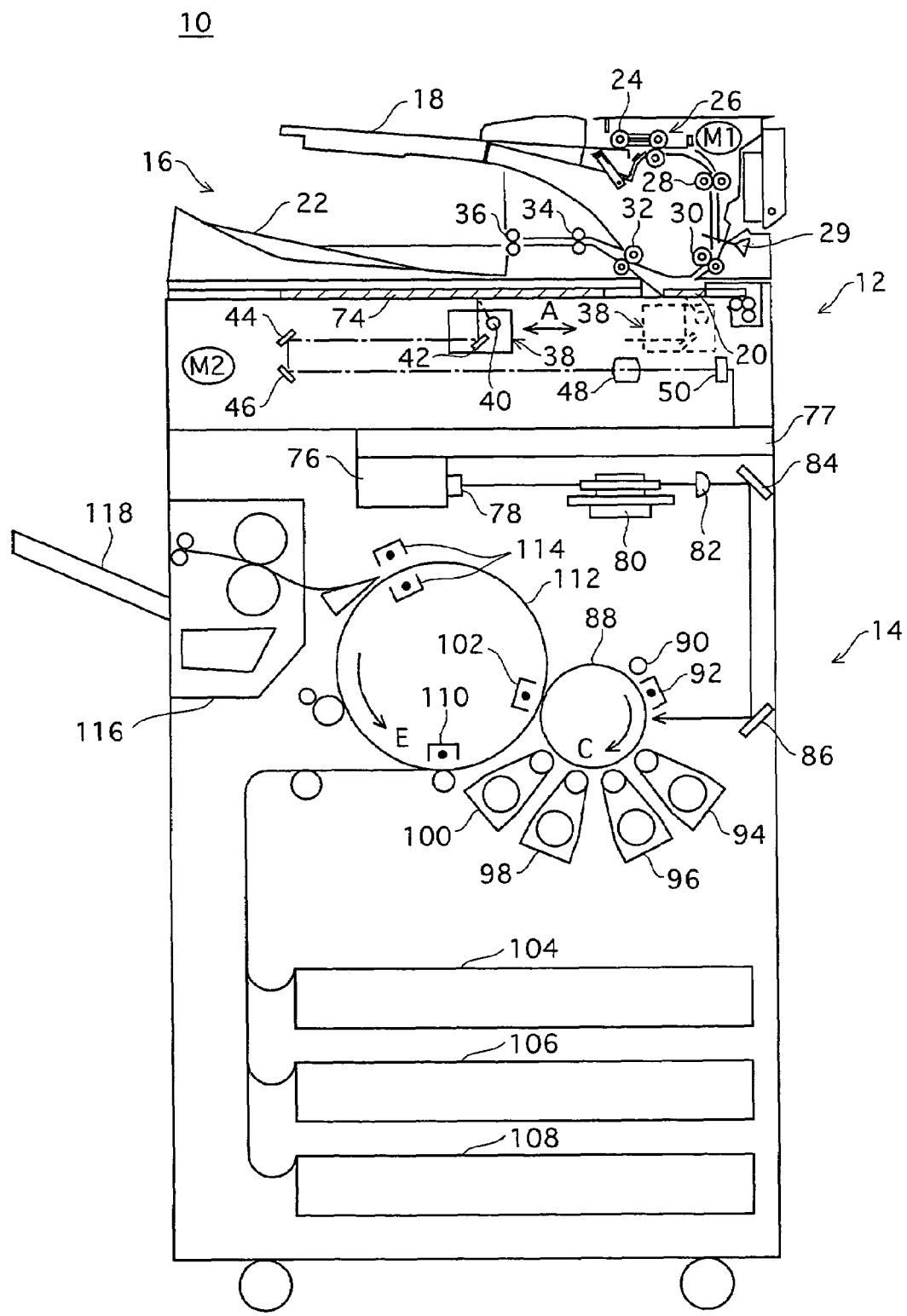
FIG. 1 is a view schematically showing structure of a digital color photocopier 10 according to an embodiment of the present invention.

FIG. 1 is a view schematically showing the overall structure of the digital color photocopier (hereinafter simply referred to as the "photocopier") 10.

The photocopier 10 is roughly divided into an image reader section 12 for reading a document image and a printer section 14 for reproducing the read image by printing the read image on a recording sheet.

The image reader section 12 is capable of reading the document image using both of sheet-through scanning as one method in a stationary optical system and mirror moving scanning as one method in a movable optical system.

In the sheet-through scanning, the document image is read by moving the document while the optical system is fixed in a stationary condition. In the mirror moving method, the document image is read by moving a mirror for guiding a reflection light from a document surface to a CCD sensor with respect to the document while the document is fixed, and the optical path length from a document reading position to the CCD sensor is always maintained at a certain length.

The image reader section 12 includes an automatic document feeder (ADF) 16 for carrying out the sheet-through scanning.

The automatic document feeder 16 separates a stack of document sheets set in a paper feed tray 18 one by one, feeds the document to pass through an upper surface (document reading position) of a sheet-through platen glass 20, and discharges the document to a document catch tray 22.

The uppermost sheet in the stack of document sheets set in the paper feed tray 18 is separated from the stack of document sheets by a pickup roller 24 and a feed roller 26. The document is fed to a resist roller 30 through a first intermediate roller 28. Further, a document resist sensor 29 for detecting a front end and a rear end of the document is provided between the first intermediate roller 28 and the resist roller 30.

After inclination (skew) of the document is corrected by the first intermediate roller 28 and the resist roller 30, the document is fed to the sheet-through platen glass 20 by the resist roller 30. After the document passes through the sheet-through platen glass 20, the document is fed to a discharge roller 36 by a second intermediate roller 32 and a third intermediate roller 34. The document is discharged to the document catch tray 22 by the discharge roller 36. These rollers use a document motor M1 as a power source, and rotations of the rollers are controlled using a power transmitting mechanism and a power interruption mechanism.

A document detection sensor 19 (not shown in FIG. 1, see FIG. 5) as a photoelectric sensor comprising a light-emitting element such as a light-emitting diode and a light-receiving element such as a photodiode is provided in the paper feed tray 18. A detection light emitted from the light-emitting element is reflected on the document placed on the paper feed tray 18, and the reflection light is received by the light-receiving element to detect the presence of the document.

The document passing through the sheet-through platen glass 20 is radiated by a white LED array 40 fixed under the sheet-through platen glass 20. The white LED array 40 is shown as an example of a white light source of a scanner 38. The optical path of the reflection light from the document surface is changed by a first mirror 42, a second mirror 44, and a third mirror 46 to form an image on a contraction three line CCD sensor 50 (hereinafter simply referred to as the "CCD sensor 50") by a condenser lens 48.

Figure 2:
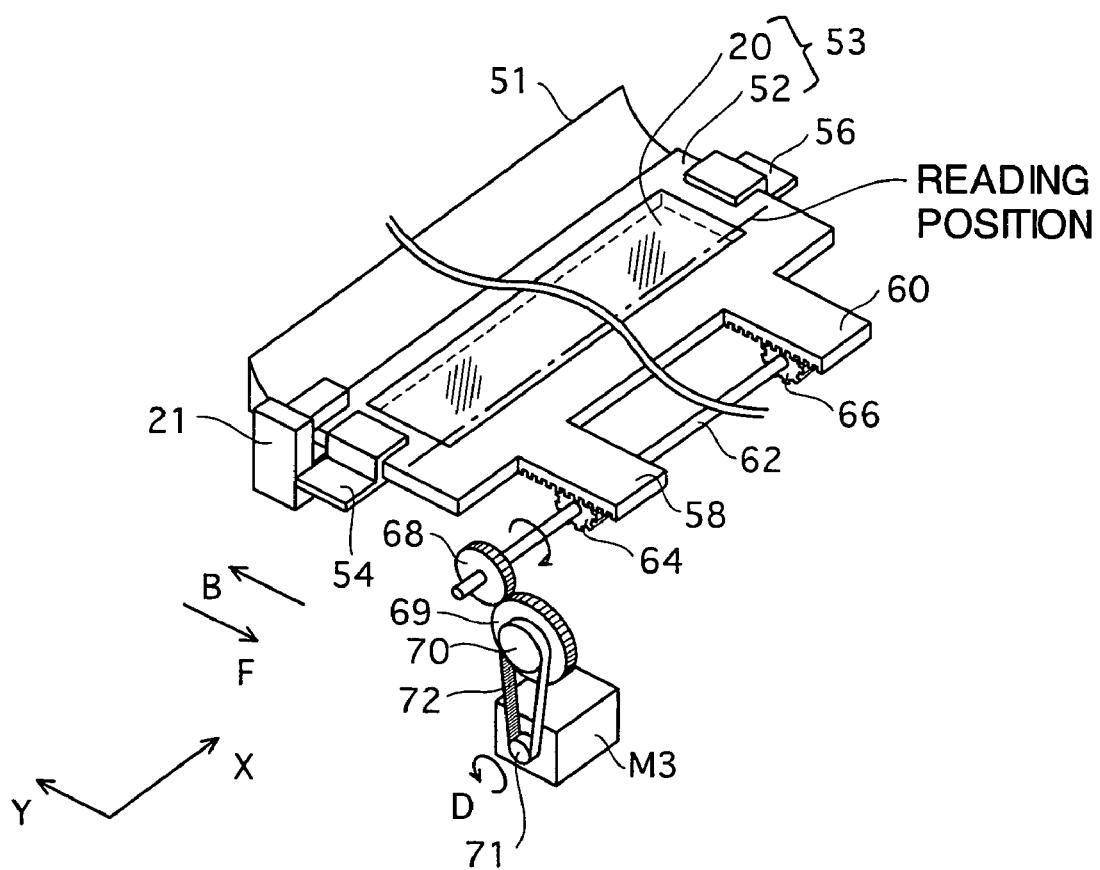
FIG. 2 is a perspective view schematically showing structure of a drive mechanism for a glass unit of the photocopier 10.

At the time of reading the document, the sheet-through platen glass 20 moves in a feeding direction of the document (i.e., in an secondary scanning direction). Next, an example of a mechanism for achieving the movement will be described with reference to FIG. 2. In FIG. 2, an arrow Y indicates the secondary scanning direction, and an arrow X indicates a main scanning direction perpendicular to the secondary scanning direction.

As shown in FIG. 2, the sheet-through platen glass 20 is made of a plate shaped glass elongated in the main scanning direction. The plate shaped glass is shown as an example of a light-transmissive member. The light-transmissive member is not limited to the glass. The light-transmissive member may be made of light-transmissive plastic. The sheet-through platen glass 20 is held in a glass holder 52. The glass holder 52 and the sheet-through platen glass 20 fitted in the glass holder 52 forms a glass unit 53. Opposite ends of the glass holder 52 in the main scanning direction are held by a pair of glass holder guides 54, 56 such that the glass holder 52 is slidable in the secondary scanning direction. The glass holder 52 includes a pair of racks 58, 60 protruding in the secondary scanning direction. The racks 58, 60 are in mesh with a pair of pinions 64, 66 attached to a shaft 62. A spur gear 68 is attached to one end of the shaft 62, and the spur gear 68 is in mesh with a spur gear 69. A pulley 70 is formed integrally on one surface of the spur gear 69. A belt 72 is stretched between the pulley 70 and an output shaft 71 of a platen glass motor M3.

In the mechanism having the above structure, when the motor M3 is rotated in a direction indicated by an arrow D (forward rotation), the driving force of the motor M3 is transmitted to the belt 72, the pulley 70, the spur gear 69, the spur gear 68, the shaft 62, the pinions 64, 66, and the racks 58, 60, successively. Thus, the glass holder 52 and the sheet-through platen glass 20 move in the secondary scanning direction indicated by an arrow F. Further, when the motor M3 is rotated in a direction opposite to the direction indicated by the arrow D (reverse rotation), the glass unit 53 (sheet-through platen glass 20) moves in the secondary scanning direction indicated by an arrow B. The movement of the glass unit 53 (sheet-through platen glass 20) in the direction indicated by the arrow F is referred to as the forward movement, and the movement of the glass unit 53 (sheet-through platen glass 20) indicated by the arrow B is referred to as the backward movement.

FIG. 2 shows a condition in which the glass unit 53 (sheet-through platen glass 20) has fully moved to a position in the direction indicated by the arrow B (fully moved toward a paper guide 51). This position is referred to as the home position.

The document is fed in the secondary scanning direction indicated by the arrow B to pass through the upper surface of the sheet-through platen glass 20. At this time, part of the document corresponding to the reading position indicated by an alternate long and short dash line is radiated by the white LED array 40, and the reflection light from the part of the document is detected by a CCD sensor 50.

The sheet-through platen glass 20 moves from the home position in the direction indicated by the arrow F while one sheet of document is read (while one sheet of document passes through the reading position). That is, the sheet-through platen glass 20 moves in the secondary scanning direction relative to the document reading position. Thus, even if foreign material such as dust is attached to the sheet-through platen glass 20, it is possible to prevent the foreign material from staying at the document reading position. Consequently, it is possible to prevent formation of a black stripe extending from one end to the other end of the reproduced image (one end to the other end in the secondary scanning direction) on the recording sheet.

A home sensor 21 detects whether the sheet-through platen glass 20 is at the home position or not. For example, the home sensor 21 is a gap type photo sensor capable of detecting a condition in which part of an end of the glass holder 52 on the side of the paper guide 51 enters a gap of the gap type photo sensor (condition in which the sheet-through platen glass 20 is at the home position) and a condition in which the end of the glass holder 52 on the side of the paper guide 51 does not enter the gap of the gap type photo sensor (condition in which the sheet-through platen glass 20 is not at the home position).

Referring back to FIG. 1, in addition to the sheet-through platen glass 20, a manual platen glass 74 is provided at a position facing the automatic document feeder 16. The document is manually placed on the manual platen glass 74.

When the document image is read using the sheet-through scanning method as described above, the scanner 38 moves to a position indicated by a broken line under the sheet-through platen glass 20, and the document fed by the automatic document feeder 16 is radiated at this position to read the document image.

When the document image is read by manually placing the document on the manual platen glass 74 (when the document image is read using the mirror moving scanning), the automatic document feeder 16 is opened upwardly, and the document is set on the manual platen glass 74. The automatic document feeder 16 is attached to the photocopier 10 positioned under the automatic document feeder 16 as a whole such that the automatic document feeder 16 can be opened and closed. An open/close detection switch 37 (not shown in FIG. 1, see FIG. 5) is attached to the photocopier 10. The open/close detection switch 37 is pressed by part of the automatic document feeder 16. That is, when the automatic document feeder 16 is closed, the open/close detection switch 37 is pressed by the part of the automatic document feeder 16, and placed in the ON state. When the automatic document feeder 16 is opened, the open/close detection switch 37 is placed in the OFF state. Therefore, it is possible to detect whether the automatic document feeder 16 is open or closed.

When the mirror moving scanning is used, the scanner 38 moves in the direction indicated by the arrow A in FIG. 1. At this time, the second mirror 44 and the third mirror 46 move in pairs. The moving direction of the second mirror 44 and the third mirror 46 is same as the moving direction of the scanner 38, and the moving speed of the second mirror 44 and the third mirror 46 is half of the moving speed of the scanner 38. Thus, the distance (optical path length) between the document surface and a condenser lens 48 is always maintained at a certain length, and the reflection light from the document forms an image on a light-receiving surface of the CCD sensor 50. The scanner 38, the second mirror 44, and the third mirror 46 use a scan motor M2 as a power source, and are driven through an unillustrated power transmitting mechanism for movement.

The CCD sensor 50 performs photoelectric conversion of the reflection light from the document into an image signal. The image signal is A/D converted by an image processing unit 148 (see FIG. 5) as described later into multiple value digital data. The digital data (hereinafter referred to as the "image data") is subjected to processes such as shading correction, density conversion, and edge reinforcement, and then, stored in an image memory 144 (FIG. 4) as described later.

The image data in the image memory 144 is read by a CPU 138 of a main control unit 136 (see FIG. 4) as described later, and inputted to a laser control unit 76 of the printer section 14. The laser control unit 76 generates a laser diode drive signal based on the image data, and causes light emission from the laser diode 78. The laser light emitted from the laser diode 78 is deflected by a polygon mirror 80, and passes through an fθ lens 82. Then, the optical path of the laser light is deflected by return mirrors 84, 86, and the surface (photosensitive surface) of a photosensitive drum 88 rotating in the direction indicated by an arrow C is exposed to the light (scanned).

An eraser lamp 90, an electrostatic charger 92, toner developers 94 to 100, and a transfer charger 102 are provided around the photosensitive drum 88. The toner developers 94 to 100 are provided separately for respective colors of cyan, magenta, yellow, and black. Before the photosensitive drum 88 is exposed to the light (scanned), charges on the photosensitive drum 88 are removed by radiation by the eraser lamp 90, and then, the electrostatic charger 92 uniformly charges the photosensitive drum 88. When the uniformly charged photosensitive surface is exposed to the light, an electrostatic latent image is formed, and the electrostatic latent image is developed to a toner image by any of the toner developers.

A recording sheet having a predetermined size is fed from any one of paper feed cassettes 104 to 108, and the fed recording sheet is wound (stuck) around a transfer drum 112 rotating in the direction indicated by an arrow E by operation of an electrostatic suction charger 110. Then, the recording sheet is fed to a transfer position facing the transfer charger 102. The transfer charger 102 operates to transfer the toner image on the photosensitive drum 88 to the recording sheet.

The above light exposure process and the transfer process are repeated separately for the respective colors of cyan, magenta, yellow, and black to one recording sheet to reproduce a color image formed by overlapping toner images of the respective colors.

After the toner images of the four colors are transferred on the recording sheet, the suction force applied to the recording sheet toward the transfer drum 112 is eliminated by a separation removal charger 114. After the toner image is fixed by a fixing device 116, the recording sheet is discharged to a tray 118.

When a black-and-white image is reproduced (when monochrome copying operation is carried out), the processing sequence of the light disposure process to the transfer process is performed only for the black color.

Each of the image reader section 12 and the printer section 14 has a dedicated CPU (see FIG. 4) which achieves the above processing sequence of copying operation.

Figure 3:
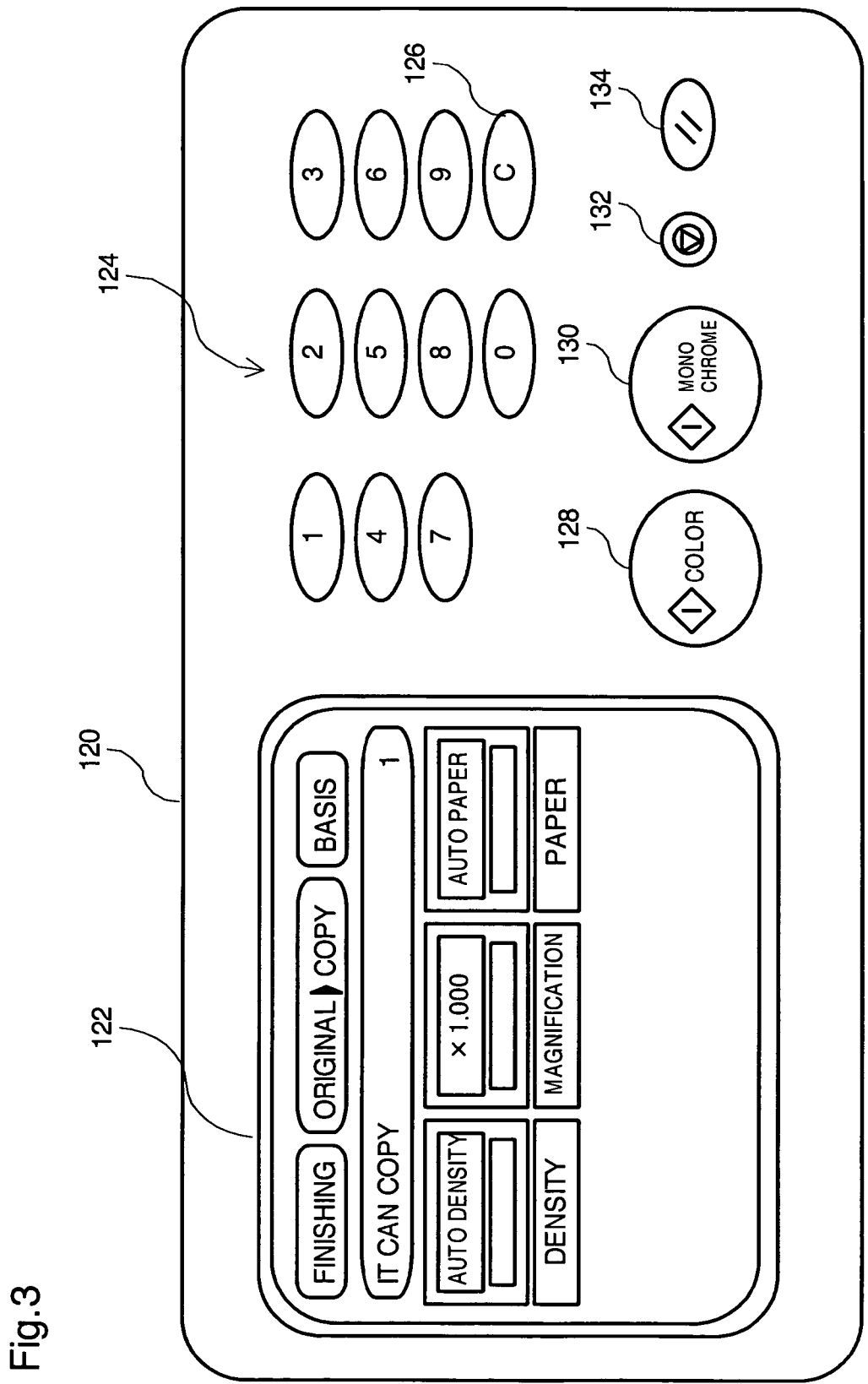
FIG. 3 is a view showing a operation panel of the photocopier 10.

The photocopier 10 includes a operation panel 120 as shown in FIG. 3 at an appropriate position on its upper surface so that the user can manipulate the operation panel 120 easily.

As shown in FIG. 3, the operation panel 120 includes a liquid crystal touch panel 122, and various keys. Copying conditions for the current copy setting, copy modes, keys for selecting a copy condition or a copy mode, and a message such as "no paper" or "paper jam" are displayed on the liquid crystal touch panel 122. A numeric keypad 124 is used for setting the number of copies. A clear key 126 is used for resetting the number of copies to "1". A color copy start key (hereinafter referred to as the "color key") 128 is used for starting color copying operation (operation of reading an image of the document in the color mode, and printing the image in the color mode). A monochrome copy start key (hereinafter referred to as the "monochrome key") 130 is used for starting monochrome copying operation (operation of reading an image of the document in the monochrome mode, and printing the image in the monochrome mode). Both of the color key 128 and the monochrome key 130 are made of light-transmissive material. A blue lamp (not shown) is provided inside, and just below each of the keys.

A stop key 132 is used to stop feeding of the document by the automatic document feeder 16 (stop reading of the document) or stop copying operation. A panel reset key 134 is used for resetting all of copying conditions such as copy density and copy magnification, and setting modes to standard values.

Figure 4:
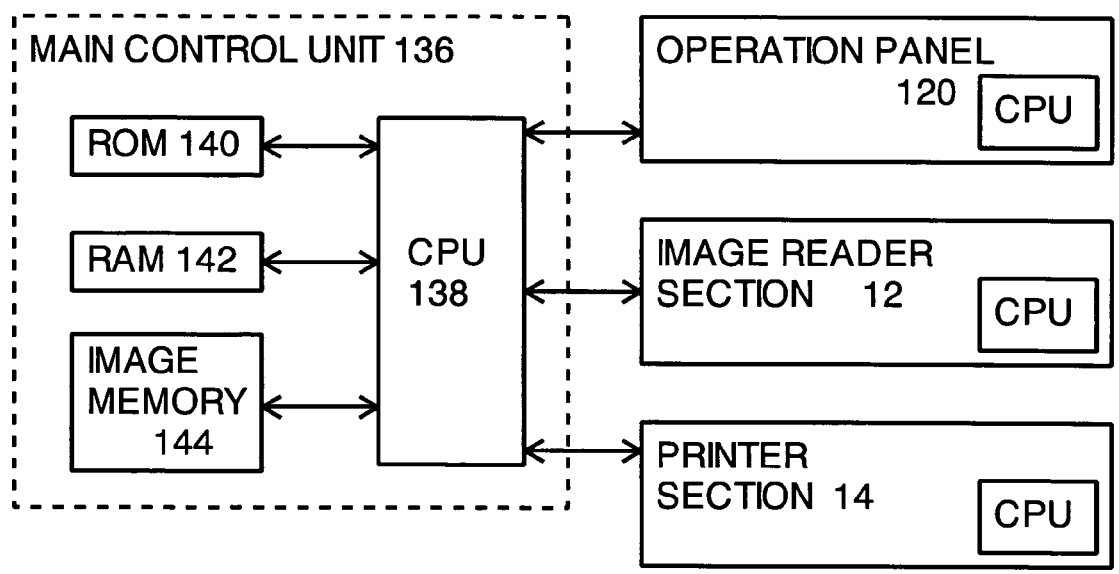
FIG. 4 is a block diagram showing control unit of the photocopier 10.

The operation panel 120 also has a dedicated CPU (see FIG. 4). The CPU controls display of the liquid crystal touch panel 122, and detects pressing of any of the keys.

FIG. 4 is a view schematically showing a main control unit 136 of the photocopier 10.

As shown in FIG. 4, the main control unit 136 includes a CPU 138 as a central component, and further includes a ROM 140, a RAM 142, and an image memory 144 connected to the CPU 138. Further, the CPU 138 is connected to the CPUs of the above described image reader section 12, the printer section 14, and the operation panel 120.

The ROM 140 stores control programs carried out by the respective CPUs.

The RAM 142 stores copy conditions such as the copy number and the copy density, and copy modes which are set through the operation panel 120.

As described above, the image memory 144 temporarily stores the image data outputted from the image reader section 12.

The CPU 138 systematically controls the operation panel 120, the image reader section 12, and the printer section 14 for achieving the smooth copying operation.

Figure 5:
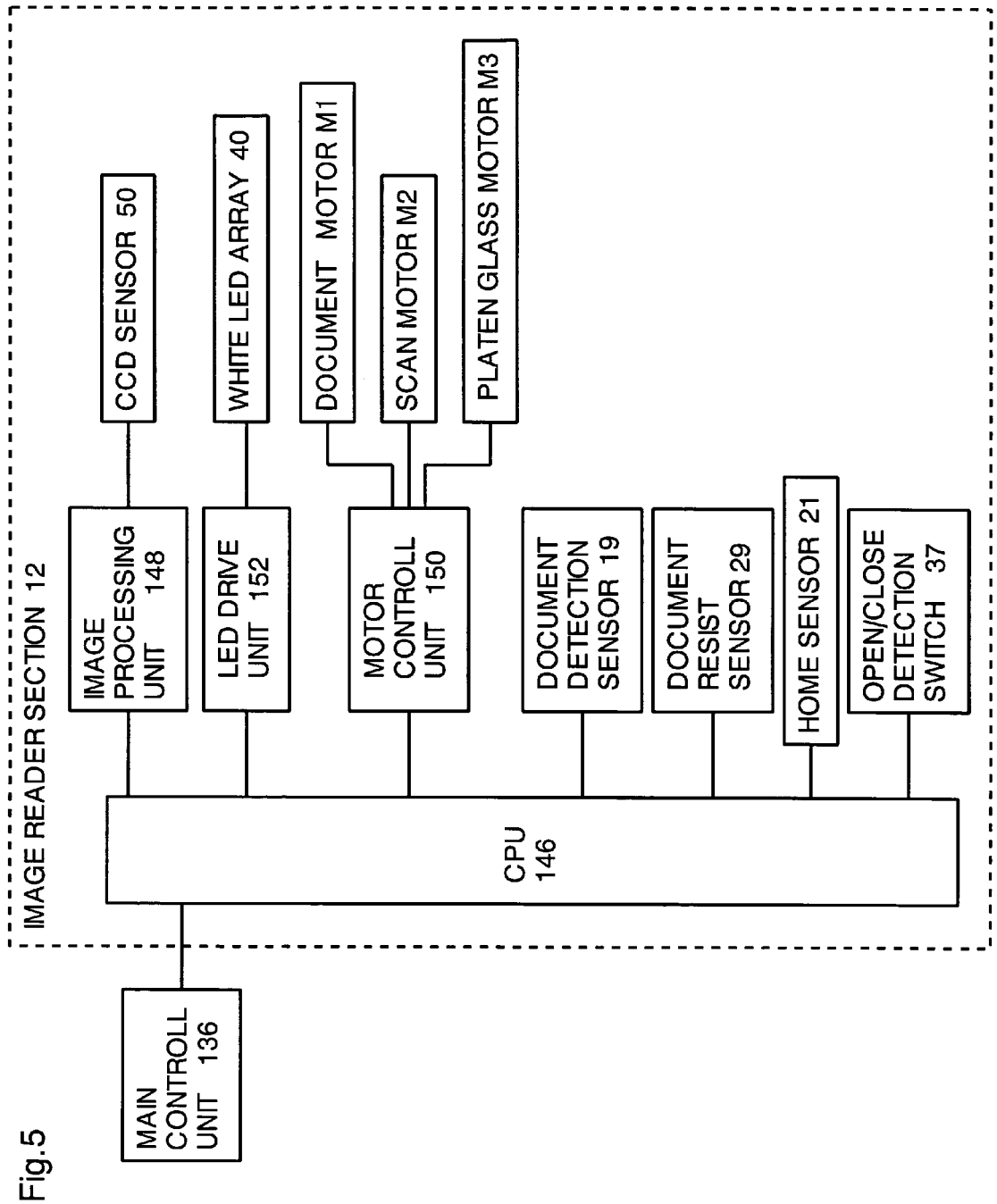
FIG. 5 is a block diagram showing an image reader section 12 of the photocopier 10.

FIG. 5 is a block diagram schematically showing structure of the image reader section 12.

As shown in FIG. 5, the image reader section 12 includes the above-described CCD sensor 50, the white LED array 40, the document motor M1, the scan motor M2, the platen glass motor M3, the document detection sensor 19, the document resist sensor 29, the home sensor 21, and the open/close detection switch 37. Further, the image reader section 12 includes a CPU 146, an image processing unit 148, a motor control unit 150, and an LED drive unit 152.

The CPU 146 receives instructions from the main control unit 136 (see FIG. 4), and systematically controls the image processing unit 148, the motor control unit 150, the LED drive unit 152 for achieving the smooth reading operation.

Next, control operations performed by the CPU 146 of the image reader section 12 will be described.

(Basic Processing)

Figure 6A:
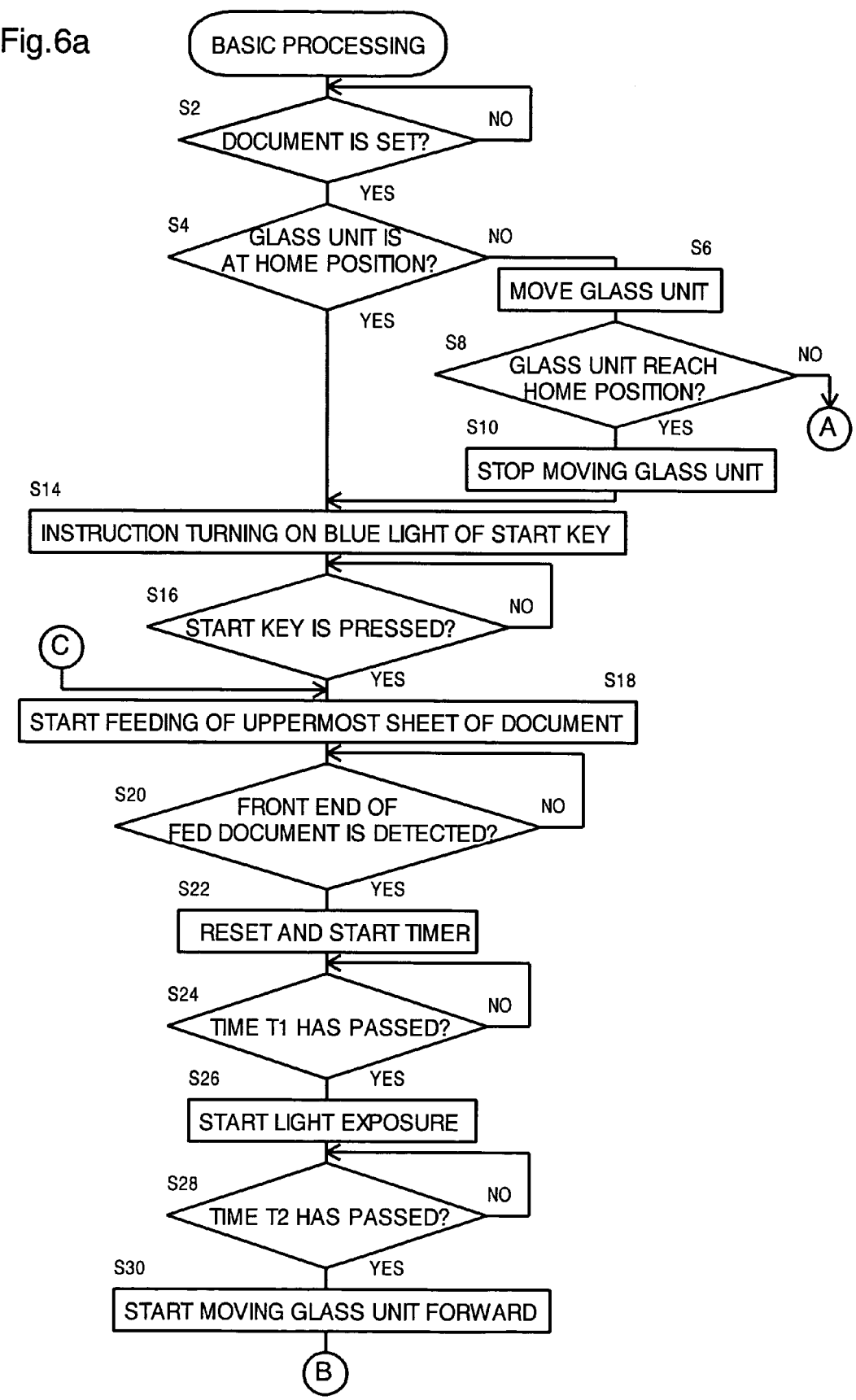
FIGS. 6b and 6b are flowcharts showing an example of basic processing in the image reader section 12.
Figure 6B:
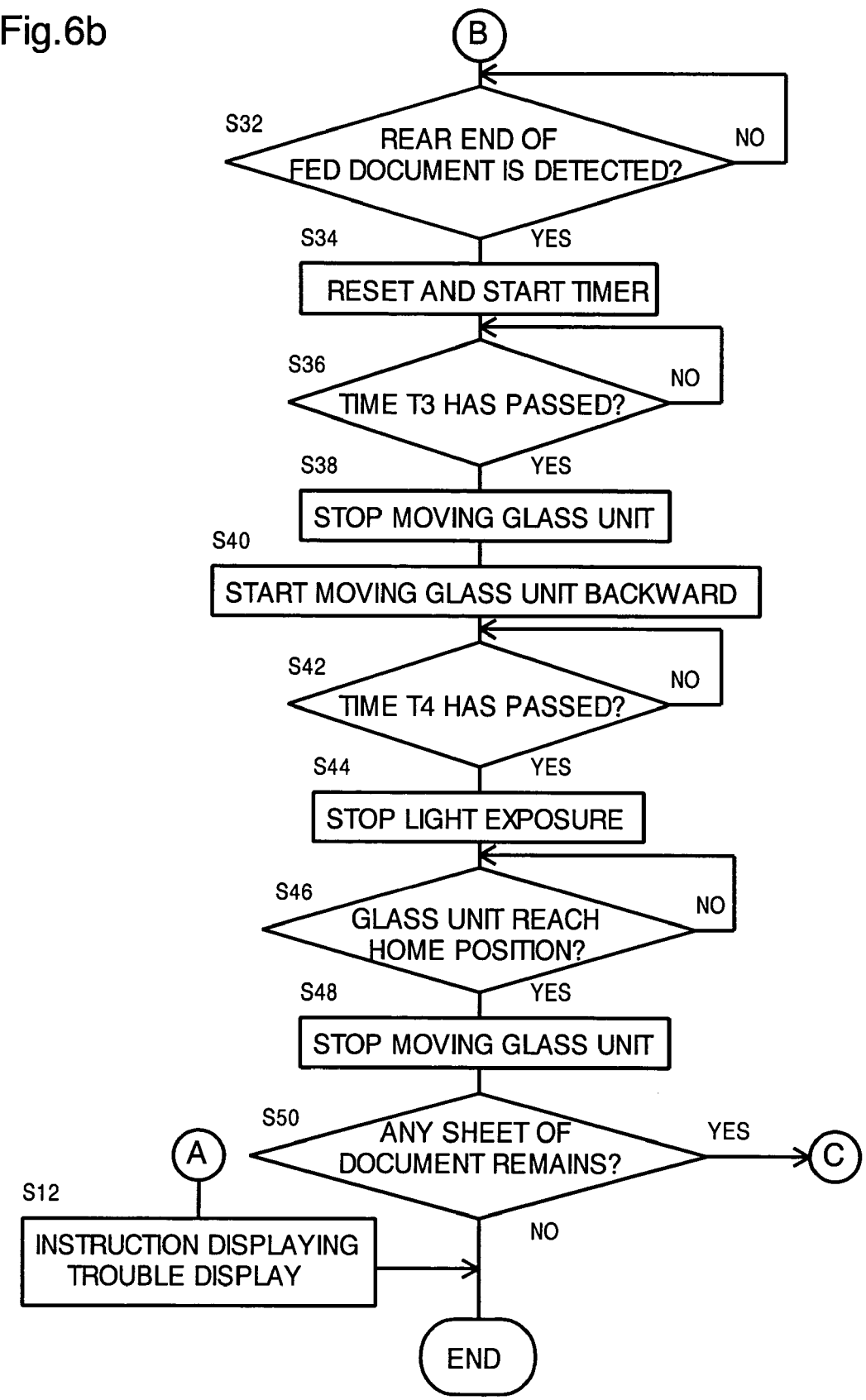

FIG. 6 is a flowchart mainly showing operations in the control for feeding the document by the automatic document feeder 16 and operations in the control for moving the sheet-through platen glass 20, of the control operations performed by the CPU 146 of the image reader section 12.

When the document detection sensor 19 detects that the document is set on the paper feed tray 18 (YES in step S2), referring to the detection result of the home sensor 21, whether the glass unit 53 (sheet-through platen glass 20) is at the home position or not is judged (step S4).

If the glass unit 53 is not at the home position (NO in step S4), reverse rotation of the platen gas motor M3 is started such that the glass unit 53 moves backward (step S6). When the home sensor 21 detects that the glass unit 53 reaches the home position (YES in step S8), the paten glass motor M3 is stopped, and the glass unit 53 is stopped at the home position (step S10). If the home sensor 21 does not detect that the glass unit 53 has reached the home position even if predetermined time has passed since the start of reverse rotation of the platen glass motor M3 (NO in step S8), it is likely that, for example, the power transmitting mechanism from the platen glass motor M3 to the pinions 64, 66 is malfunctioning. Therefore, a trouble display instruction is sent to the main control unit 136 (step S12), and the process is finished. The predetermined time is the time sufficient for moving the glass unit 53 from a position, which is considered as the remotest from the home position, to the home position. When the main control unit 136 receives the trouble display instruction, the main control unit 136 controls the operation panel 120 to display (indicate) the occurrence of the trouble.

If it is confirmed that the glass unit 53 is at the home position in step S4, or if the glass unit 53 is brought back to the home position by the processes in steps S6 to S10, an instruction is given to the main control unit 136 to turn on a blue light of the start key (step S14). When the main control unit 136 receives the instruction, the main control unit 136 turns on the blue light of the start key in the operation panel 120. Therefore, the user can recognize that reading of the document is ready.

When the operation panel 120 detects that the start key is pressed, and the notification indicating the pressing of the start key is performed through the main control unit 136 (YES in step S16), feeding of the uppermost sheet of the document set in the paper feed tray 18 is started by controlling the document motor M1 or the like (step S18).

When a front end of the fed document is detected by the document resist sensor 29 (YES in step S20), the CPU 146 resets, and then, starts an internal timer (not shown) (YES in step S22).

When the internal timer counts predetermined time T1 (YES in step S24), the white LED array 40 is turned on to start light exposure of the document (step S26). The predetermined time T1 herein means the time required for moving the front end of the document from a detection position of the document resist sensor 29 to, e.g., a position between the intermediate roller 30 and the document reading position.

When the internal timer counts predetermined time T2 (YES in step S28), forward rotation of the platen glass motor M3 is started such that the glass unit 53 moves forward (step S30). The predetermined time T2 herein means the time required for moving the front end of the document from the detection position of the document resist sensor 29 to, e.g., the document reading position.

Then, when a rear end of the fed document is detected by the document resist sensor 29 (YES in step S32), the CPU 146 resets, and then, starts the internal timer (step S34).

When the internal timer counts predetermined time T3 (YES in step S36), the platen glass motor M3 is stopped to stop the movement of the glass unit 53 (step S38). Then, reverse rotation of the platen glass motor M3 is started such that the glass unit 53 moves backward (step S40). The predetermined time T4 herein means the time required for moving the rear end of the document from the detection position of the document resist sensor 29 to, e.g., the document reading position.

When the internal timer counts predetermined time T4 (YES in step S42), the white LED array 40 is turned off to stop light exposure of the document (step S44). The predetermined time T4 herein means the time required for moving the rear end of the document from the detection position of the document resist sensor 29 to, e.g., a position between the document reading position and the second intermediate roller 32.

When the home sensor 21 detects that the glass unit 53 moving backward reaches the home position (YES in step S46), the platen glass motor M3 is stopped to stop the glass unit 53 at the home position (step S48).

Next, referring to the detection result of the document detection sensor 19, it is determined whether there is any sheet of document remaining on the paper feed tray 18 (step S50). If any sheet of document is remaining on the paper feed tray 18 (YES in step S50), the processes from step S18 are repeated. If no sheet of document is remaining on the paper feed tray 18 (NO in step S50), the processing sequence is finished.

In the basic processing as described above, while one sheet of document is read (while one sheet of document passes through the document reading position), the sheet-through platen glass 20 continuously moves in one direction, i.e., in the secondary scanning direction. Therefore, even if foreign material such as dust is attached to the sheet-through platen glass 20, it is possible to prevent the foreign material from staying at the document reading position. Consequently, a black stripe produced on the recording sheet due to reading of the foreign material does not extend from one end to the other end of the document. That is, in comparison with the case in which the sheet-through platen glass 20 is fixed, it is possible to reduce the occurrence of the black stripe.

Further, though the sheet-through platen glass may reciprocate back and forth several times while one sheet of the document is read, such reciprocal movement is not preferable for the following reason. In the reciprocal movement, the sheet-through platen glass changes the direction of movement while reading one sheet of document (forward movement to backward movement, or backward movement to forward movement). At the time of changing the direction, the speed of the movement becomes zero. When the direction is changed (when the movement speed becomes zero), if the foreign material attached on the sheet-through plate glass is at the document reading position, the foreign material stays at the document reading position for a long time in comparison with the case in which the sheet-through platen glass is continuously moving (the case in which the speed does not become zero). As a result, one black stripe formed on the recording sheet is long in comparison with the case in which the sheet-platen glass is continuously moving.

Next, trouble processing will be described. The trouble processing is performed interrupting the basic processing when an interruption event occurs for some reasons, and it is not possible to continue the document reading.

(First Trouble Processing)

In the following description, the interruption event of reading the document occurs when the user presses the stop key 132, or when a trouble such as a failure of feeding the document (so called document jam) occurs in the automatic document feeder (ADF) 16.

Figure 7:
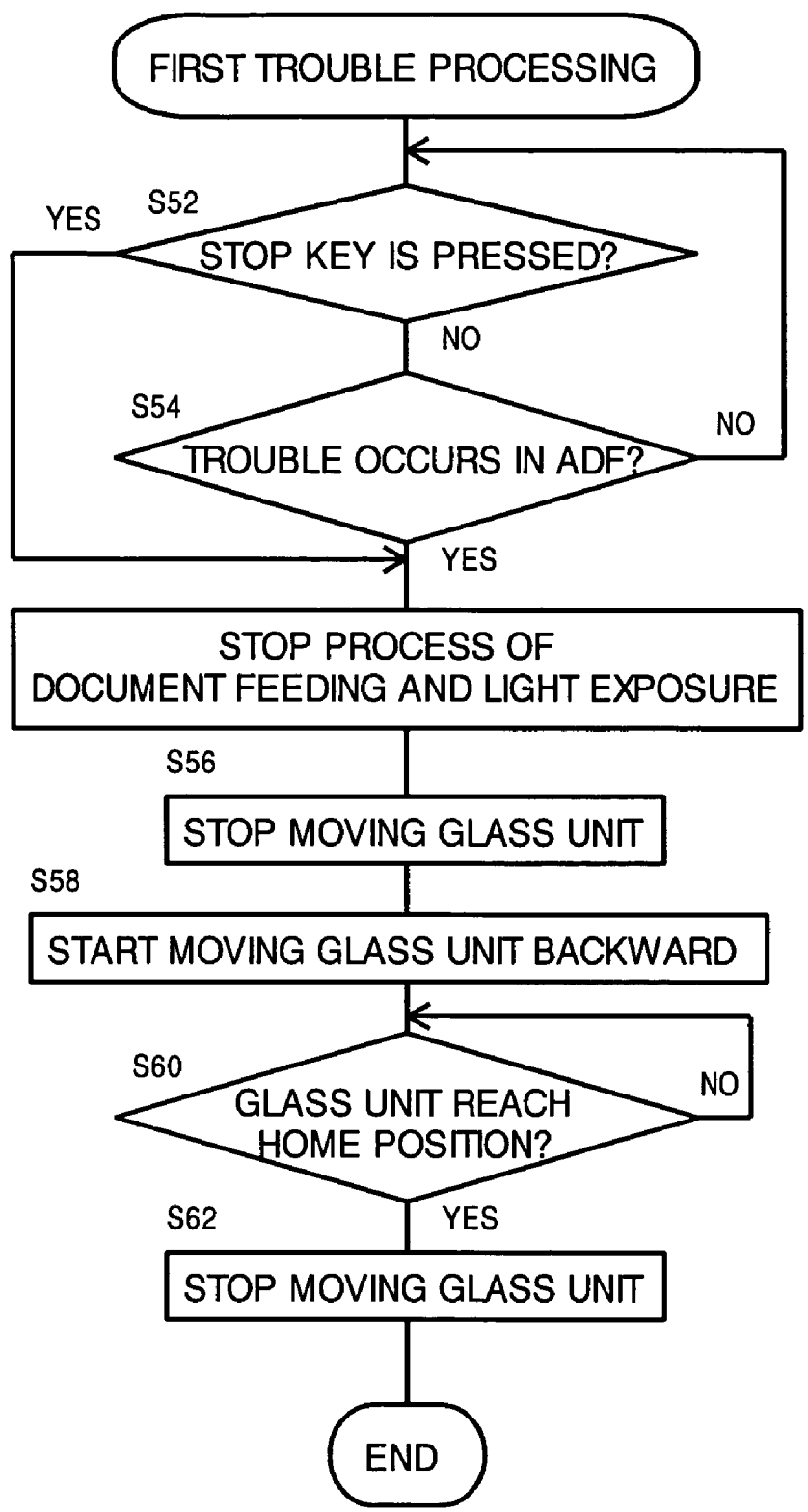
FIG. 7 is a flowchart showing an example of trouble processing in the image reader section 12.

FIG. 7 is a flowchart showing processes in this case.

When the stop key 132 is pressed (YES in step S52) or when a trouble such as a document jam in the automatic document feeder (ADF) 16 is detected (YES in step S54), the document feeding process and the light exposure process (steps S18 to S50 in FIGS. 6a and 6b) are stopped (step S55) and the platen glass motor M3 is stopped to stop the movement of the glass unit 53 (step S56). Further, reverse rotation of the platen glass motor M3 is started such that the glass unit 53 moves backward (step S58). When the home sensor 21 detects that the glass unit 53 moving backward reaches the home position (YES in step S60), the platen glass motor M3 is stopped, and the glass unit 53 is stopped at the home position (step S62) to finish the series of processes in the first trouble processing. The pressing of the stop key 132 is detected in the operation panel 120. The detection result is notified to the CPU 146 of the image reader section 12 through the main control unit 136. The detection of the document jam in the automatic document feeder is well known, and description thereof will be omitted.

In the above processing, when the stop key 132 is pressed, or a trouble occurs in the automatic document feeder 16, the movement of the glass unit 53 is immediately stopped, and the glass unit 53 moves back to the home position. Therefore, when the next document is read, since the glass unit 53 is already waiting at the home position, it is possible to start reading of the document smoothly. That is, if only the glass unit is stopped when a trouble occurs in the automatic document feeder, it is necessary to move the glass unit back to the home position at the time of reading the next document. Therefore, for moving the glass unit back to the home position, the start of reading the document is delayed. The embodiment of the present invention can avoid such situation.

(Second Trouble Processing)

In the second trouble processing, the interruption events of reading the document include opening of the automatic document feeder (ADF) 16 in addition to the pressing of the stop key 132 by the user in the first trouble processing and the document feeding failure in the automatic document feeder (ADF) 16.

Figure 8:
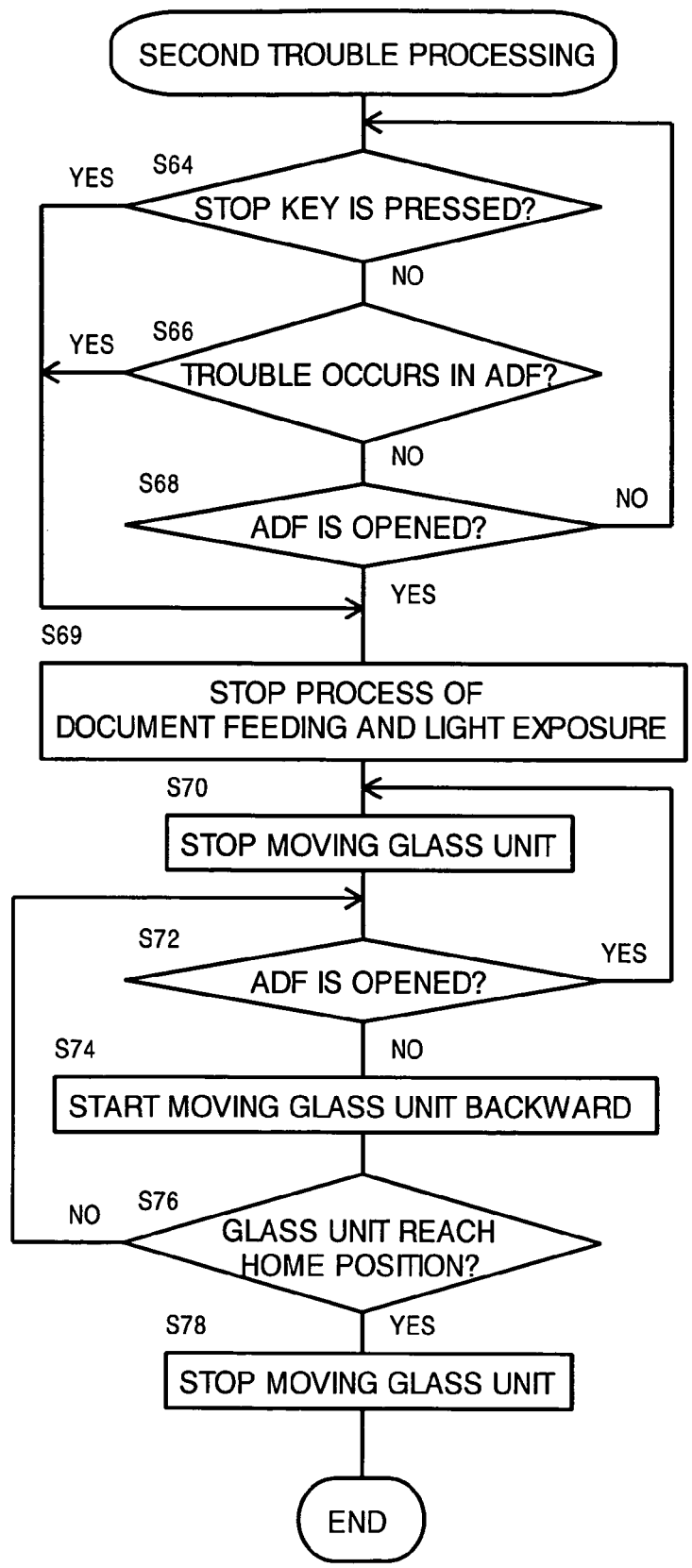
FIG. 8 is a flowchart showing an example of trouble processing in the image reader section 12.

FIG. 8 is a flowchart showing processes in this case.

When the stop key 132 is pressed (YES in step S64), when a trouble such as a document jam in the automatic document feeder (ADF) 16 is detected (YES in step S66), or when opening of the automatic document feeder (ADF) 16 is detected by the open/close detection switch 37 (YES in step S68), the document feeding process and the light exposure process (steps S18 to S50 in FIGS. 6a and 6b) are stopped (step S69) and the platen glass motor M3 is stopped to stop the movement of the glass unit 53 (step S70).

When it is confirmed that the automatic document feeder (ADF) 16 is closed referring to the detection result of the open/close detection switch 37 (NO in step S72), reverse rotation of the platen glass motor M3 is started such that the glass unit 53 moves backward (step S74). When the home sensor 21 detects that the glass unit 53 moving backward reaches the home position (YES in step S76), the platen glass motor M3 is stopped, and the glass unit 53 is stopped at the home position (step S78) to finish the series of processes in the second trouble processing.

When the automatic document feeder (ADF) 16 is opened (YES in step S72) while the glass unit 53 is moving backward (step S74), the movement (backward movement) of the glass unit 53 is stopped (step S70).

In the above processing, when the automatic document feeder (ADF) 16 is opened, the movement of the glass unit 53 is prohibited (steps S72, S70). The movement of the glass unit 53 is permitted only when the automatic document feeder (ADF) 16 is closed.

For example, assuming that the sheet-through platen glass 20 is moved while it is exposed, if an unexpected object contacts the sheet-through platen glass 20, the sheet-through platen glass 20 may be damaged. The embodiment of the present invention can avoid such situation.

(Third Trouble Processing)

In the first trouble processing and the second trouble processing, the interruption events of reading the document occur in the image reading section 12. In the third trouble processing, the interruption events occur in the printer section 14.

Possible troubles (interruption events) in the printer section 14 include a failure of feeding the recording sheet (so called recording sheet jam).

Figure 9:
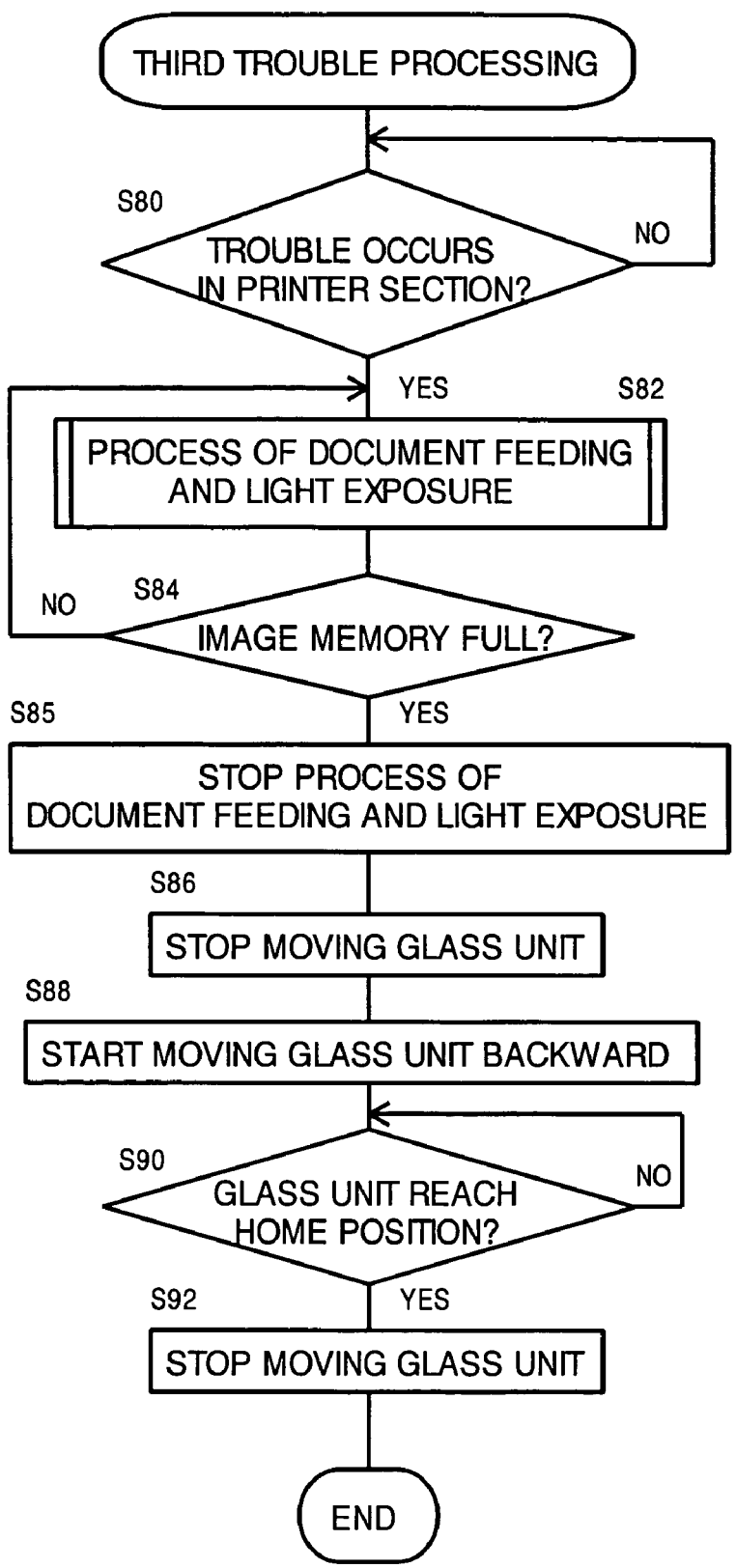
FIG. 9 is a flowchart showing an example of trouble processing in the image reader section 12.

FIG. 9 is a flowchart showing processes in this case.

Even if a trouble such as a recording sheet jam occurs in the printer section 14 (YES in step S80), the document feeding process and the light exposure process (steps S18 to S50 in FIG. 6) are continued (step S82) since the trouble does not affect reading of the document. Detection of the recording sheet jam is well known, and description thereof will be omitted.

In this case, since no image is formed on the recording sheet, the image data is accumulated in the image memory 144. Therefore, when there is no remaining space in the memory (YES in step S84), after the document feeding process and the light exposure process (steps S18 to S50 in FIGS. 6a and 6b) are stopped (step S85), processes in steps S86 to S92 are performed. The processes in steps S86 to S92 are identical to the above-described processes in steps S56 to S62 (see FIG. 7), and thus, description thereof will be omitted. When there is no remaining memory space in the image memory 144, this information is notified from the main control unit 136 to the CPU 146 of the image reader section 12.

In the above example, when a trouble occurs in the printer section 14 (YES in step S80), the routine proceeds to the processes from step S85 in consideration of the remaining space in the image memory 144. However, the present invention is not limited in this respect. The routine may proceed to the process in step S85 regardless of the remaining space in the image memory 144 (that is, steps S82, S84 in the flowchart of FIG. 9 may be omitted).

Although the present invention has been fully described in connection with the preferred embodiments thereof with reference to the accompanying drawings, it is to be noted that various changes and modifications are apparent to those skilled in the art. Such changes and modifications are to be understood as included with in the scope of the present invention as defined by the appended claims unless they depart therefrom.

(1) In the basic processing shown in FIG. 6, at the time when the rear end of the document reaches the document reading position (YES in step S36), the glass unit 53 is stopped to move the glass unit 53 backward. However, the timing is not limited to this time. For example, the glass unit 53 may be stopped before the rear end of the document fully passes the document reading position. Specifically, the glass unit 53 may be stopped when a position away from the rear end of the document internally in the secondary scanning direction (document feeding direction) by 4 mm passes the document reading position. It is likely that the area away from the end of the document by the distance of this extent is a blank area, and no image is read from this area. Therefore, even if the above-described long black stripe is reproduced on the recording sheet when the direction of the movement of the sheet-through platen glass 20 is changed, it is likely that the black stripe does not overlap on the intended document image, and the undesirable affect of the black stripe is considered to be small. In the meanwhile, since the backward movement of the glass unit 53 can be started before the rear end of the document passes through document reading position, it is possible to rapidly move the glass unit 53 back to the home position. As a result, reading of the next document can be started sooner. When a plurality of document sheets are read successively, the total time from the start to the end of reading the document can be reduced. It is a matter of course that the timing can be changed by adjustment of the predetermined time T3.

(2) In the above-described embodiment, the direction of the forward movement of the glass unit 53 is opposite to the feeding direction of the document. Conversely, the direction of the forward movement of the glass unit 53 may be the same as the feeding direction of the document.

(3) Only one of the first trouble processing, the second trouble processing, and the third trouble processing may be carried out. Alternatively, the first trouble processing and the third trouble processing may be carried out at the same time or the second trouble processing and the third trouble processing may be carried out at the same time.

What is claimed is:

1. An image forming apparatus comprising:
    a transparent member;
    a feeding unit that feeds an original document to the transparent member;
    a reading unit that reads an image of the document fed on the transparent member via the transparent member;
    a moving unit that reciprocates the transparent member in a prescribed direction; and
    a controller that moves the transparent member forward in one direction from a home position while one document passes through a reading position, and
    stops the transparent member and then moves the transparent member backward to the home position when an interruption event of reading the document occurs.

2. The image forming apparatus according to claim 1, wherein said interruption event is a feeding failure of the document in said feeding unit.

3. The image forming apparatus according to claim 1, further comprising:
    a receiving unit that receives a reading interruption instruction from a user,
    wherein said interruption event is the reading interruption instruction from said receiving unit.

4. The image forming apparatus according to claim 1, wherein said feeding unit feeds the document from a plurality of sheets of document stack one by one at intervals and said controller moves the transparent member backward to the home position in a time period from the time when a rear end of one document passes the reading position until the time when feeding of the next document is started.

5. The image forming apparatus according to claim 1, wherein said feeding unit feeds the document from a plurality of sheets of document stack one by one at intervals and said controller stops the transparent member and moves the transparent member backward for returning the transparent member to the home position before the rear end of one document does not fully pass the reading position.

6. The image forming apparatus according to claim 1, further comprising:
an image forming unit that reproduces a read image by printing the read image on a recording sheet,
wherein said interruption event is a feeding failure of the recording sheet in the image forming unit.

7. The image forming apparatus according to claim 1, wherein said feeding unit is attached to an image forming apparatus body such that the feeding unit can be opened and closed, and reading of the document is performed when the feeding unit is closed with respect to the image forming apparatus body; and said interruption event is opening of the feeding unit with respect to the image forming apparatus.

8. The image forming apparatus according to claim 7, wherein said control unit prohibits movement of the transparent member when the feeding unit is opened.

9. An image reading apparatus comprising:
a transparent member;
a feeding unit that feeds an original document to the transparent member;
a reading unit that reads an image of the document fed on the transparent member via the transparent member;
a moving unit that reciprocates the transparent member in a prescribed direction; and
a controller that moves the transparent member forward in one direction from a home position while one document passes through a reading position, and stops the transparent member and then moves the transparent member backward to the home position when an interruption event of reading the document occurs.

10. The image reading apparatus according to claim 9, wherein said interruption event is a feeding failure of the document in said feeding unit.

11. The image reading apparatus according to claim 9, further comprising:
a receiving unit that receives a reading interruption instruction from a user, wherein said interruption event is the reading interruption instruction from said receiving unit.

12. The image reading apparatus according to claim 9, wherein said feeding unit feeds the document from a plurality of sheets of document stack one by one at intervals and said controller moves the transparent member backward to the home position in a time period from the time when a rear end of one document passes the reading position until the time when feeding of the next document is started.

13. The image reading apparatus according to claim 9, wherein said feeding unit feeds the document from a plurality of sheets of document stack one by one at intervals and said controller stops the transparent member and moves the transparent member backward for returning the transparent member to the home position before the rear end of one document does not fully pass the reading position.

14. The image reading apparatus according to claim 9, wherein said feeding unit is attached to an image reading apparatus body such that the feeding unit can be opened and closed, and reading of the document is performed when the feeding unit is closed with respect to the image reading apparatus body; and said interruption event is opening of the feeding unit with respect to the image reading apparatus.

15. The image reading apparatus according to claim 14, wherein said controller prohibits movement of the transparent member when the feeding unit is opened.

16. The image forming apparatus according to claim 1, wherein the transparent member comprises a see-through platen and a rack disposed near the see-through platen; the reading unit that reads the image of the document via the see-through platen; and the moving unit comprises a pinion that mates with the rack of the transparent member.

17. The image forming apparatus according to claim 16, wherein the transparent member further comprises a second rack, and the moving unit further comprises a shaft and a second pinion, the two pinions mating the two racks and being configured to rotate about the shaft while the transparent member moves in the prescribed direction.

18. The image reading apparatus according to claim 9, wherein the transparent member comprises a see-through platen and a rack disposed near the see-through platen; the reading unit that reads the image of the document via the see-through platen; and the moving unit comprises a pinion that mates with the rack of the transparent member.

19. The image reading apparatus according to claim 18, wherein the transparent member further comprises a second rack, and the moving unit further comprises a shaft and a second pinion, the two pinions mating the two racks and being configured to rotate about the shaft while the transparent member moves in the prescribed direction.

* * * * *